(12) United States Patent
Harter et al.

(10) Patent No.: US 7,060,232 B2
(45) Date of Patent: Jun. 13, 2006

(54) POLYFUNCTIONAL SUB-ASSEMBLY FOR CONTACT, MATERIAL DISTRIBUTION AND HEAT AND/OR MATERIAL EXCHANGE OF AT LEAST ONE GAS PHASE AND AT LEAST ONE LIQUID PHASE

(75) Inventors: Isabelle Harter, Lyons (FR); Robert Agoero, Vienne (FR); Thierry Gauthier, Brignais (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 612 days.

(21) Appl. No.: 09/835,369

(22) Filed: Apr. 17, 2001

(65) Prior Publication Data
US 2002/0127160 A1 Sep. 12, 2002

(30) Foreign Application Priority Data
Apr. 17, 2000 (FR) .................................. 00 05020

(51) Int. Cl.
B01J 8/02 (2006.01)
B01J 8/04 (2006.01)

(52) U.S. Cl. ........................................ 422/190; 422/193
(58) Field of Classification Search ................ 422/190, 422/191, 193–195; 261/94–98
See application file for complete search history.

(56) References Cited

U.S. PATENT DOCUMENTS

| | | | | |
|---|---|---|---|---|
| 3,218,249 A | | 11/1965 | Ballard et al. | 208/108 |
| 3,431,084 A | * | 3/1969 | Forbes | 208/178 |
| 4,140,625 A | * | 2/1979 | Jensen | 208/146 |
| 5,073,236 A | * | 12/1991 | Gelbein et al. | 203/29 |
| 5,232,283 A | * | 8/1993 | Goebel et al. | 366/336 |
| 5,275,790 A | * | 1/1994 | Buchholz et al. | 422/217 |
| 5,523,062 A | * | 6/1996 | Hearn et al. | 422/195 |
| 5,882,610 A | * | 3/1999 | Darmancier et al. | 422/220 |
| 2001/0051119 A1 | * | 12/2001 | Overbeek et al. | 422/211 |
| 2003/0124038 A1 | * | 7/2003 | Moritz et al. | 422/211 |

* cited by examiner

*Primary Examiner*—Kevin P. Kerns
(74) *Attorney, Agent, or Firm*—Millen, White, Zelano & Branigan, P.C.

(57) ABSTRACT

A sub-assembly is described that ensures contact, material distribution and heat and/or material exchange of at least one gas phase, at least a portion of which is hydrogen, and at least one liquid phase, for a vessel containing at least one bed of granular solid, said phases being in overall downflow mode and traversing said bed of granular solid, said sub-assembly comprising at least one distributor tray (P) located above the bed of granular solid, comprising a plurality of downcomers (1) each surmounted by at least one jet disturber device and each having in its upper portion at least one cross section of flow (22) for entry of the major portion of said gas phase into said downcomer and, between said upper portion and the lower portion of said downcomer above tray (P), at least one cross section of flow (2) for entry of the major portion of said liquid phase into said downcomer, and in its lower portion at least one cross section of flow (23) of the mixture formed in the downcomer for distributing it over the bed of granular solid located below said lower portion, each downcomer containing at least one packing extending across the whole of the transverse cross section of the downcomer between its upper portion and its lower portion in the circulation zone, constituted by cells through which said liquid and said gas phase pass, said cells orientating the circulation of fluids inside said downcomer in a substantially radial direction.

16 Claims, 4 Drawing Sheets

POLYFUNCTIONAL SUB-ASSEMBLY FOR CONTACT, MATERIAL DISTRIBUTION AND HEAT AND/OR MATERIAL EXCHANGE OF AT LEAST ONE GAS PHASE AND AT LEAST ONE LIQUID PHASE

The present invention relates to a polyfunctional sub-assembly ensuring contact, material distribution and heat and/or material exchange, which can optimise the distribution of a fluid comprising at least one gas phase at least a portion of which is hydrogen and at least one liquid phase, for a vessel containing at least one bed of granular solid, said fluid circulating in an overall downflow mode through said bed of granular solid (or solid particles). In particular, the invention relates to the application of said sub-assembly to distributing a two-phase or poly-phase mixture comprising at least one gas phase at least a portion of which is hydrogen. The invention also relates to a vessel comprising close to its upper end an inlet for a first liquid fluid and a second gaseous fluid, containing at least one bed of granular solid and with a polyfunctional sub-assembly above said bed This sub-assembly can be disposed:
either at the head of the vessel, which usually is a reactor;
or at the outlet from a granular bed (supplying the subsequent granular bed over the whole cross section of the vessel);
or after injecting a supplemental fluid (for example a heat transfer gas, usually a cooling gas termed a quench gas or a gas for carrying out a reaction such as a hydrogenation reaction).

The present invention is of particular application to the field of gas/liquid distributors where the gas phase is partially composed of hydrogen. The present invention is of particular application in all cases
where the gas phase is in the vast majority compared with the liquid phase, i.e., where the ratio between the gas and the liquid is usually more than 3:1 by volume and normally less than 400:1 (3<gas vol/liquid vol<400),
a where the reaction is highly exothermic and necessitates introducing a supplemental fluid (usually a gas) into the reactor to cool the gas/liquid mixture;
where the reaction requires intimate contact to allow a compound (for example hydrogen $H_2$) to dissolve in the liquid phase.

In particular, the present invention is applicable to all hydrocracking, hydrotreatment, hydrodesulphurisation, hydrodenitrogenation total and selective hydrogenation, and/or hydrodemetallisation of liquid cuts but also for partial or complete oxidation reactions, amination, acetyloxidation, ammoxidation and halogenation reaction, such as chlorination.

In the specific field of hydrodesulphurisation, hydrodenitrogenation and hydrocracking, to achieve high efficiency conversions (to obtain a product containing, for example, 30 ppm (parts per million) of sulphur or less), a good distribution of gas and liquid, principally liquid, is necessary as the volume ratios are generally between about 3 1 and about 400:1 and usually about 10:1 to about 200 1, in the case of quenching, very good contact is required between the gas introduced to carry out cooling and the fluids from the process being carried out, usually termed the process fluids.

Because of the small proportion of liquid compared with the gas, one possibility used in the prior art consists, for example, of using distributor trays comprising a plurality of apertures for the passage of liquid and a plurality of downcomers for the passage of gas. Descriptions of such devices can be obtained, for example, from United States patents U.S. Pat. No. 3,353,924, U.S. Pat. No. 4,385,033 and U.S. Pat. No. 3,855,068.

However, such solutions cause problems as regards the flexibility of use of the trays, and can also result in irregular supply from the different orifices if the trays are not perfectly horizontal and/or the because of the backflow caused by the huge drop in liquid and gas streams on the trays To overcome such disadvantages, the skilled person has been directed to use a specific arrangement of a plurality of trays the last one being either provided with means for collecting and distributing the liquid and gas phases in a separate manner as described, for example, in U.S. Pat. No. 5,232,283, or in the form of a mixture as described, for example, in U.S. Pat. No. 4,126,539, U.S. Pat. No. 4,126,540, U.S. Pat. No. 4,836,989 and U.S. Pat. No. 5,462,719.

A further disadvantage of that type of tray and arrangement is the absence of liquid diffusion at the outlet from the downcomers or apertures. The skilled person is then led to considerably increase the number of injection points as described in particular in French patents FR-A-2 745 202 and in U.S. Pat. No. 5,688,445, but is limited by the strength of the tray or by using jet disturber type systems at the orifice or downcomer outlets as described, for example, in FR-A-2 654 952 and International patent applications WO-A-95/35159 and WO-A-97/46303

Further, in the case of exothermic reactions requiring cooling using a supplemental fluid that is usually gaseous but may be liquid, the systems proposed generally comprise a succession of the following internal means: means for introducing a quench fluid, a mixing chamber intended to cool and homogenise the process fluids and a system of double distribution trays, such as those described in U.S. Pat. No. 4,836,989, U.S. Pat. No. 5,232,283, U.S. Pat. No. 5,462,719, U.S. Pat. No. 5,567,396 and in European patent EP-A-0 716 881, the difference between those different solutions proposed in those patents essentially being provided by the complexity of the mixing chambers used (twin chambers, blades, baffles).

The major drawback with those systems, in addition to the non optimal distribution quality, is the bulk (space taken up in the reactor). In prior art systems, the speed of the gas in the downcomers is generally between 0.5 and 5 centimeters per second (cm/s) and the speed of the liquid is generally between 0.05 and 1 cm/s. Such speeds are too low to permit both mixing and dispersion, and this constitutes a major disadvantage.

The aim of the present invention is to overcome at least partially the disadvantages of the solutions proposed in the prior art and also.
to ensure optimal distribution of gas and liquid over the whole surface in the form of a spray or fine liquid film by reducing the number of injection points;
to produce efficient contact between the gas and the liquid to ensure correct heat exchange (quench function) or material exchange (for example, dissolving hydrogen in the liquid phase);
to minimise the bulk in the reactor (use of a single tray to carry out all of the functions described above).

The present invention concerns a polyfunctional sub-assembly ensuring contact, material distribution and heat and/or material exchange of at least one gas phase, at least a portion of which is hydrogen, and at least one liquid phase, for a vessel containing at least one bed of granular solid, said phases being in overall downflow mode and traversing said bed of granular solid, said sub-assembly comprising at least one distributor tray (P) located above the bed of granular solid, comprising a plurality of downcomers or tubes (1) each surmounted by at least one jet disturber device and each having in its upper portion at least one cross section of flow (22) for entry of the major portion of said gas phase into said downcomer and, between said upper portion and the lower portion of said downcomer above tray (P), at least one cross section of flow (2) for entry of the major portion of said liquid phase into said downcomer, and in its lower portion at least one cross section of flow (23) for the two-phase or poly-phase mixture formed in said downcomer for distributing it over the bed of granular solid located below said lower portion, the sub-assembly being characterized in that each downcomer contains at least one packing between its upper portion and its lower portion constituted by at least one element the cross section for flow of which is essentially transverse to the downcomer axis, said element extending across the whole of the transverse cross section of the downcomer in the circulation zone and being constituted by cells through which said liquid and said gas phase pass, said cells orientating the circulation of fluids inside said downcomer in a substantially radial direction.

In other words, said sub-assembly forms part of a device for distributing a mixture comprising at least one gas phase and at least one liquid phase, said mixture flowing as a downflow through a bed of granular solid, and originating either from the reactor inlet line or from an upper bed of granular solid.

Each downcomer or tube comprises at least two cross sections of flow (2) for the liquid phase located at different levels above a distributor tray (P) and below the cross section of flow (22) that is closest to said distributor tray (P). These cross sections are, for example, apertures pierced in the periphery and at a plurality of levels, preferably 2 or 3 levels; the number of apertures and their diameter is calculated so as to obtain the desired flexibility. The apertures are of any shape, for example substantially circular. These passages (2) can also be slots pierced in the downcomers or tubes (1) over their height or their width and their number, preferably two or three slots, is calculated so as to obtain the desired flexibility. The cross section of flow (2) of the liquid phase closest to the distributor tray (P) is located at a sufficient distance from said tray (P) so that a level of liquid is established above said tray (P). These downcomers or tubes (1) are surmounted at their upper portion by caps (et disturber device) intended to break any jets coming either from the inlet line or from the upper bed of granular solid and to allow separation of the gas and liquid. Liquid enters the tube via the apertures or slots and gas enters via the upper portion via the cross section of flow (22) between the cap and the top of the downcomer or tube (1).

The use of a packing inside the downcomers or tubes (1) can provide energy to the gas/liquid mixture and produce a high velocity in the downcomer or tube (1) The packing used is, for example, a Sulzer type packing, in particular one known under reference number SMV or SMX, or those from Koch-Glitsch, such as those with reference number RMT, or one of those described in patents from those companies relating to static mixers or column packings, or a packing as defined in EP-A-0 719 850. Such packings are characterized in that they are constituted by at least one element wherein the cross section of flow is essentially transverse to the axis of the vessel, this element extending over the whole transverse cross section of the vessel in the circulation zone and being constituted by cells through which the process liquid, the process gas and possibly the quench fluid pass, these cells orientating the circulation of the fluids inside the downcomer in a substantially radial direction. This packing produces very good contact between the gas and the liquid and encourages heat exchange (quench function) and/or material exchange (dissolution function).

In one implementation of the present invention, near the cross section of flow (23) of the lower portion of each downcomer, the sub-assembly comprises at least one means for dispersing a two-phase or poly-phase mixture formed in said downcomer In one implementation of the present invention, each downcomer contains at least two non contiguous packings, the last packing ensuring said function of dispersing the two-phase or poly-phase mixture formed in said downcomer. In a particular implementation of the present invention, the last packing located close to the cross section of flow (23) of the lower portion of each downcomer and carrying out said function for dispersing a two-phase or poly-phase mixture formed in said downcomer comprises a portion that is internal to the downcomer and a portion that is external to said downcomer.

In a further implementation of the present invention, the means ensuring dispersion of the two-phase or poly-phase mixture formed in said downcomer is an jet disturber device with a controlled porosity located below and close to the cross section of flow (23) of the lower portion of said downcomer In the present invention, each downcomer can comprise an individual jet disturber device or one jet disturber device is used for an array of downcomers, or one jet disturber device extends over the whole cross section of the vessel Usually, the downcomer comprises a portion above the distributor tray (P) and a portion below the distributor tray (P). in other words, the tubes extend through the base of the tray.

When the means ensuring dispersion of the two-phase or poly-phase mixture formed in said downcomer is a packing, it is preferably selected from packings with specific angles to create the desired diffusion (spraying the surface in the form of a spray). The angle of diffusion is normally from 10° to 60°, the preferred function being to obtain an angle of diffusion of the order of 30° When the means ensuring dispersion of the two-phase or poly-phase mixture formed in said downcomer is an jet disturber device, it is preferably a specific jet disturber device with a controlled porosity that depends on the gas and liquid flow rates (sprinkling the surface of the bed of granular solid in the form of a film of liquid) The porosity, expressed as the surface area ratio (void surface area/total surface area of jet disturber device) is in the range 5% to 50% of the surface area of the jet disturber device, preferably 10% to 20% of the surface area of the jet disturber device.

The device of the present invention has the following advantages.

- it reduces the number of injection points. The downcomer density per square meter is normally in the range 1 to 150, preferably in the range 10 to 50;
- it finely distributes liquid over the entire surface in the case of a large gas/liquid ratio (difficult to distribute only a little liquid) The angle of diffusion is greatly increased by using a diffusing system (jet disturber device or specific packing) at the downcomer outlet. In prior art systems, the angle of diffusion is almost zero;
- the quench function is integrated: this improves the heat transfer efficiency;
- the saving on space is substantial (no quench assembly);
- the dissolution function is integrated into different levels in the reactor;
- the system is flexible and robust.

The invention also concerns a vessel comprising close to its upper end an inlet for a first liquid fluid and for a second gaseous fluid, containing at least one bed of granular solid there being mounted above said bed is a sub-assembly as defined above, said vessel comprising above said sub-assembly at least one side inlet for a third fluid, preferably a gas, which may be identical to or different from said first or second fluid. Usually, said third fluid is a heat exchange fluid and/or a material exchange fluid for exchange with at least one of said first or second fluids. This vessel is normally used to carry out a catalytic reaction in which the bed (beds) of granular solid is/are a bed (or beds) of catalyst, in particular for carrying out a catalytic reaction wherein one of the reactants is hydrogen.

Further advantages and characteristics of the invention will become clear from the following description of an example made with reference to the accompanying drawings, in which.

Figure 1:
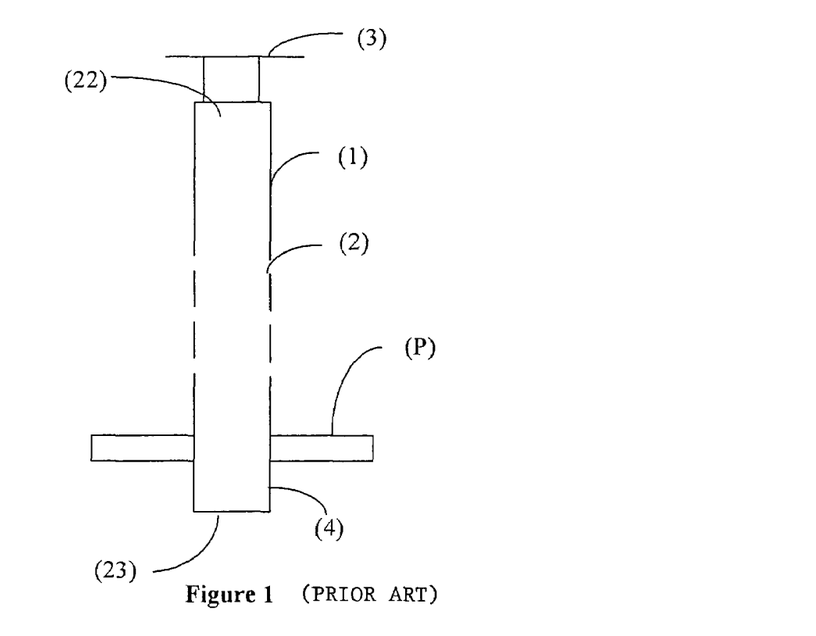
FIG. 1 shows the principle of a prior art implementation such as that shown in the Applicant's French patent FR-A-2 745 202.

FIG. 1 shows a portion of a prior art device comprising tubes (1) pierced with apertures (2) at their periphery and at a plurality of levels, the number of apertures and their diameter is calculated as a function of the desired flexibility. A level of liquid is established. Its depth is generally 50 to 200 mm. The depth of the downcomers is usually in the range 100 to 500 mm, preferably in the range 250 to 450 mm. The upper portions of these tubes are surmounted by caps (3) (jet disturber device) intended to break jets from either the inlet line or an upper bed of granular solid and to enable the gas and liquid to separate. The tubes extend (4) beyond the base of tray (P) by a depth that is normally in the range 20 to 100 mm. Liquid penetrates into the tube via the apertures and gas enters via the upper portion (22). At the downcomer outlet (23), a jet of two-phase mixture is produced that is at most the width of the downcomer diameter.

Figure 2:
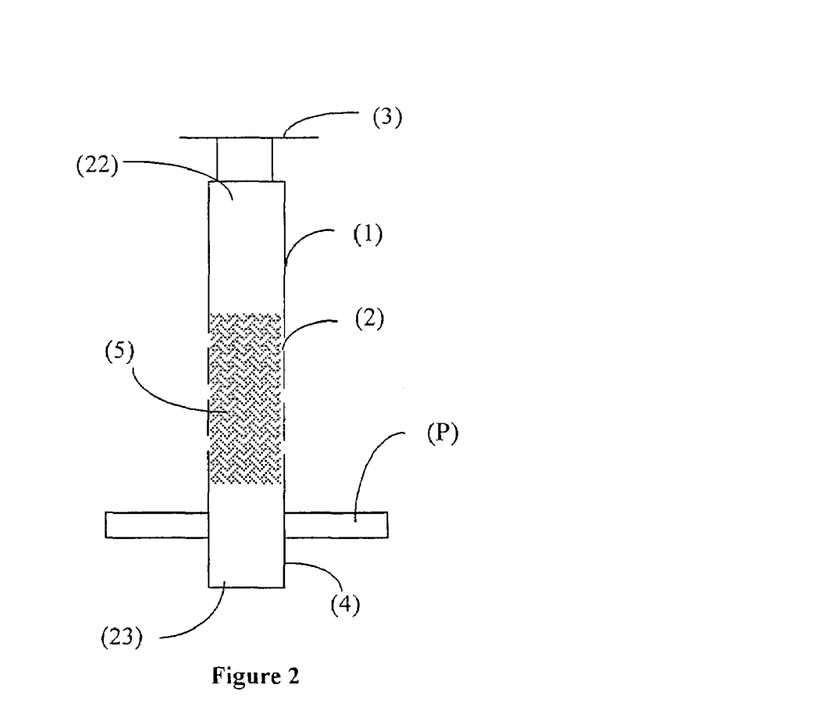
FIG. 2 shows a sub-assembly of the present invention comprising a packing inside the downcomer.

FIG. 2 shows a portion of a sub-assembly in accordance with the present invention comprising tubes (1) pierced with apertures (2) at their periphery at two levels: the number of aperture and the diameter is calculated as a function of the desired flexibility. A level of liquid is established. Its depth is generally in the range 50 to 200 mm. The depth of the downcomers is normally in the range 100 to 500 mm, preferably in the range 250 to 450 mm. The upper portions of these tubes are surmounted by caps (3) (jet disturber device) intended to break jets from either the inlet line or the upper bed of granular solid and to enable the gas and liquid to separate. The tubes extend (4) beyond the base of tray (P) by a depth that is normally in the range 20 to 100 mm. Liquid penetrates into the tube via the apertures and gas enters via the upper portion (22). The interior of the downcomer is filled over a depth that is more than the distance between the aperture (2) closest to tray (P) and the aperture (2) furthest away from this tray (P) with a Sulzer type packing (5) sold under reference number SMV. This packing is characterized in that it is constituted by at least one element wherein the cross section of flow is essentially transverse to the vessel axis, this element extending over the whole transverse cross section of the vessel in the circulation zone and being constituted by cells through which the process liquid, the process gas and the quench fluid pass, these cells orientating the fluid circulation in a substantially radial direction. The two-phase mixture formed in tube (1) leaves via the lower end (23) of this tube.

The packing has a twofold function:
producing a spray of liquid droplets which can then produce better sprinkling of the catalytic surface;
in the case where a supplemental gas is introduced, two supplemental functions are carried out: material exchange of one phase with another (gas/gas, liquid/liquid), heat exchange between one phase and the two process phases (gas/process gas, liquid/process liquid).

Figure 3:
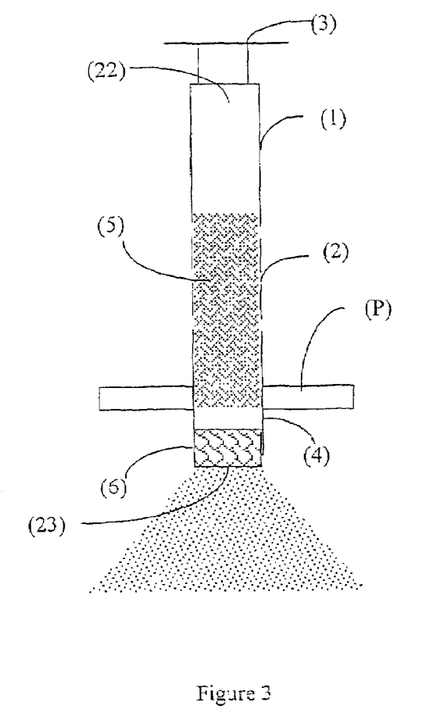
FIGS. 3 and 4 show two implementations of a sub-assembly comprising a means for dispersing a two-phase or poly-phase mixture formed in the downcomer.
Figure 4:
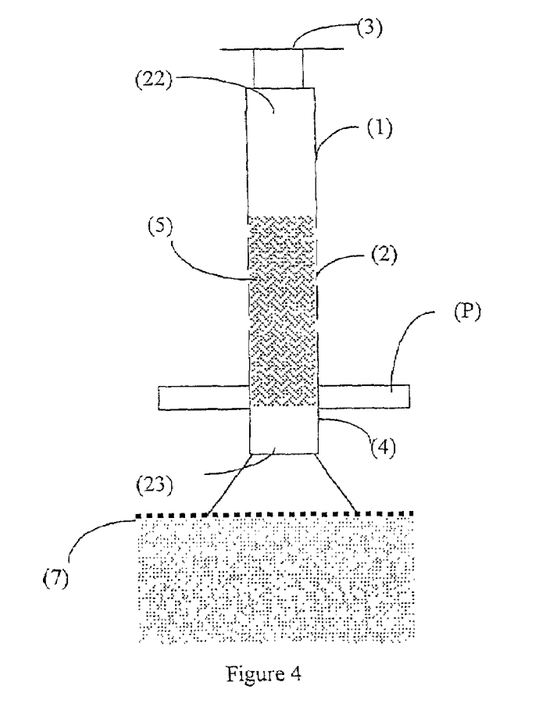

FIGS. 3 and 4 show a portion of a sub-assembly of the present invention comprising a supplemental means located close to the lower end of tube (1) which increases the dispersion of the gas/liquid mixture at the downcomer outlet to spray a larger catalytic surface area.

In the diagram of FIG. 3, this supplemental means is a packing (6) with specific angles to create the desired dispersion (sprinkling onto the surface in the form of a spray) The dispersion angles are from 10° to 60°, preferably of the order of 30°. This packing is located over a depth of the order of 50 mm and extends below the lower end of tube (1) by about 20 mm. The other elements are identical to those described with respect to FIG. 2

In the diagram of FIG. 4, this supplemental means is a specific jet disturber device (7) with a controlled porosity that depends on the liquid and gas flow rates (sprinkling onto the surface in the form of a liquid film). The porosity is from 5% to 50%, preferably 10% to 20%. The distance between the bottom of the downcomer and the jet disturber device is in the range 10 to 200 mm, preferably of the order of 50 to 100 mm. The other elements are identical to those described with respect to FIG. 2.

Figure 5A:
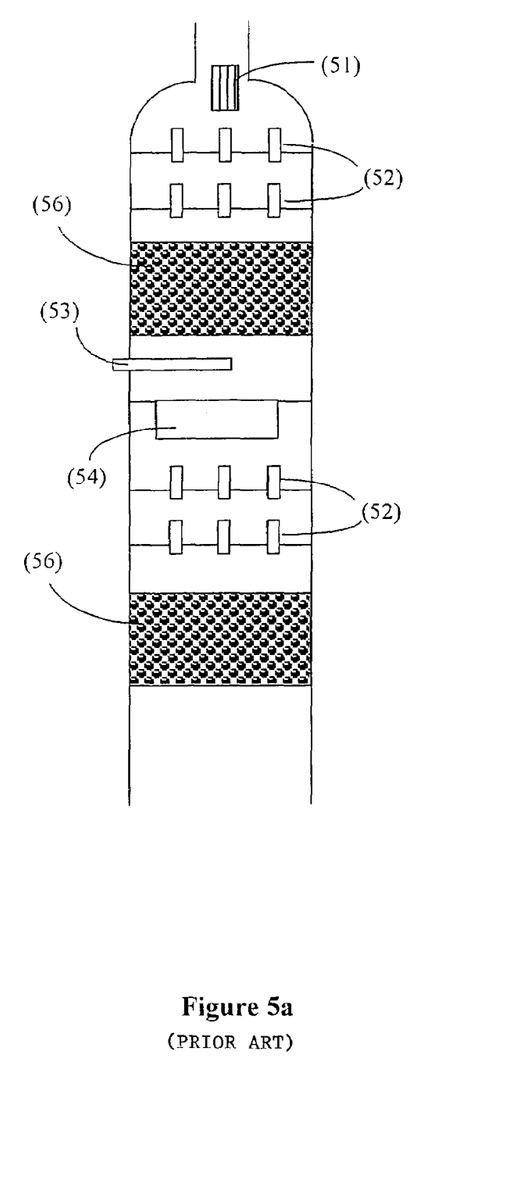
FIGS. 5a and 5b are diagrams of a vessel containing, in the case of FIG. 5a, a prior art distribution means (see, for example, U.S. Pat. No. 5,232,283) comprising a mixing chamber to carry out the quench function and, for FIG. 5b, a sub-assembly according to the present invention.

FIG. 5a shows a catalytic reactor containing a plurality of beds (56) of catalyst comprising an overhead diffuser (51), a two-stage tray (52) to ensure correct gas and liquid distribution, a catalytic bed (56), a tube (53) for introducing a supplemental phase (gas or liquid), a mixing chamber (54) to ensure the quench function or for material transfer and a further double-pass tray to properly re-distribute the gas/liquid mixture This assembly occupies a minimum 20% of the reactor volume.

Figure 5B:
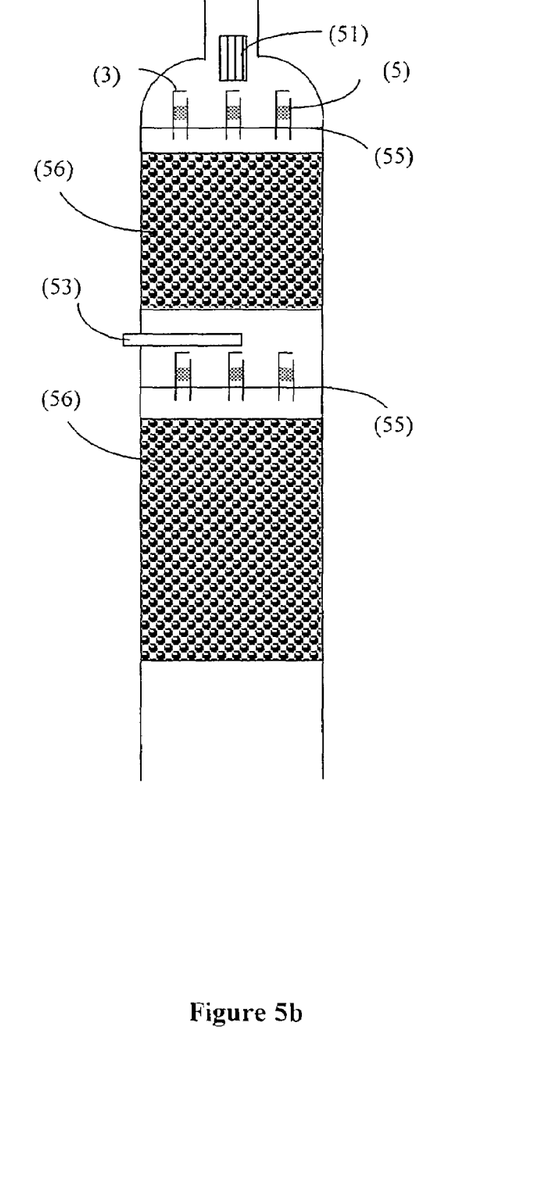
Figure 6:
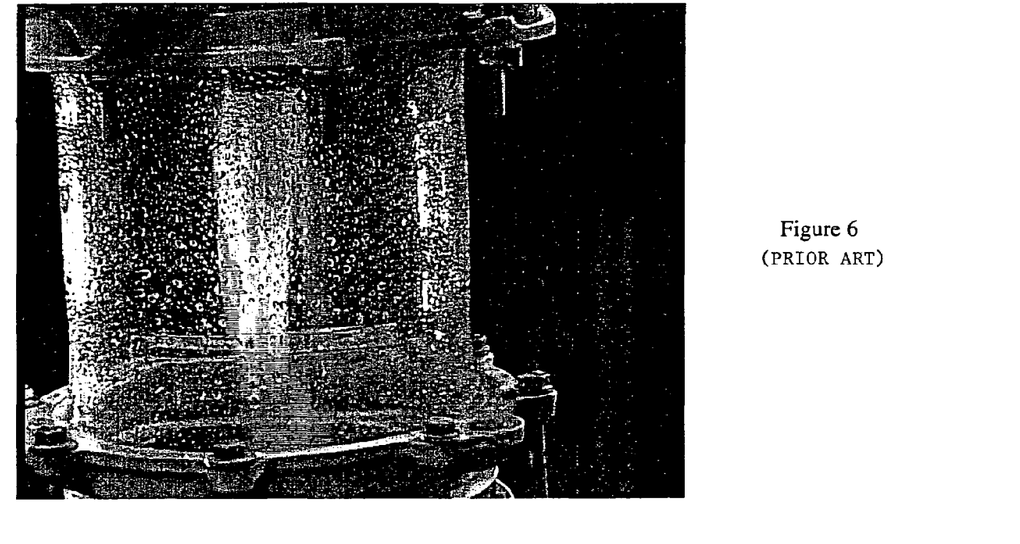
FIG. 6 is a photograph taken during tests carried out on an experimental model showing, below a prior art distribution device, a transparent portion of Plexiglass showing the poor dispersion obtained when using such a device.
Figure 7:
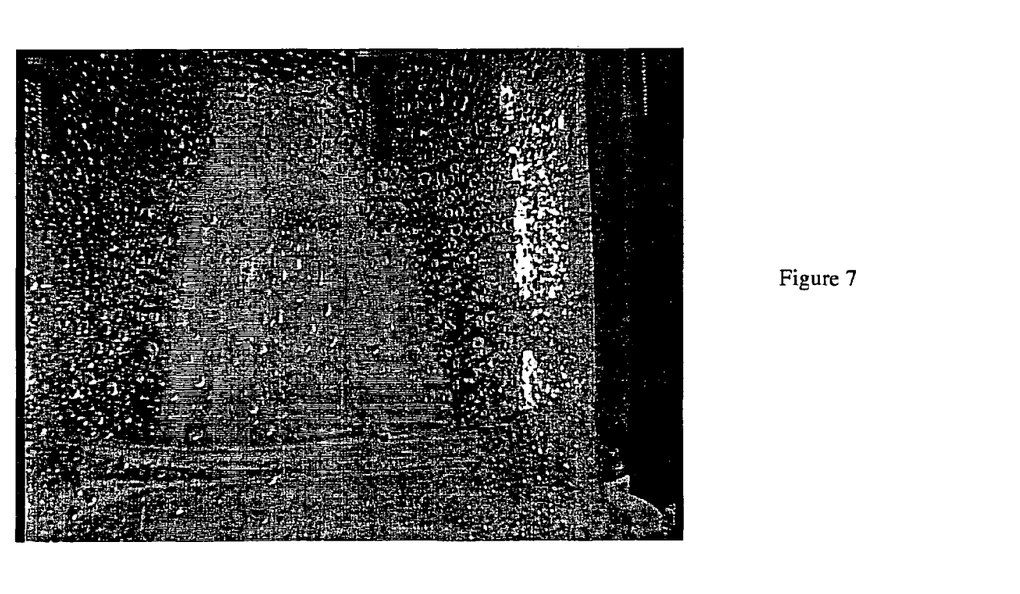
FIG. 7 is a photograph taken during tests carried out on an experimental model showing, below the sub-assembly of the present invention, the substantial improvement in the angle of dispersion obtained when the downcomer comprises a single packing as described in connection with FIG. 2.

FIG. 5b shows a vessel containing a plurality of catalyst beds containing a sub-assembly of the present invention which in addition to improving distribution (increasing the spray effect) can minimize the space taken up by the internal means in the reactor by using a one-stage tray (55) (no double-pass tray or mixing chamber). The elements designated by the same reference numbers as those shown in FIGS. 2 and 5a are identical to those described with respect to these figures. The geometry of jet disturber device (3) is different from that shown in FIG. 2. This jet disturber device is a deflector fixed on the tube (1) that forms an inlet that is skewed with respect to the top and bottom of tube (1).

The invention claimed is:

1. A polyfunctional sub-assembly ensuring contact, material distribution and heat and/or material exchange of at least one gas phase, and at least one liquid phase, for a vessel containing at least one bed of granular solid, said phases being in overall downflow mode and traversing said bed of granular solid, said sub-assembly comprising at least one distributor tray (P) located above the bed of granular solid, comprising a plurality of downcomers (1) having a substantially vertical axis, each surmounted by at least one jet disturber device and each having in its upper portion at least one cross section of flow (22) for entry of the major portion of said gas phase into said downcomer and, between said upper portion and the lower portion of said downcomer above tray (P), at least one cross section of flow (2) for entry of the major portion of said liquid phase into said downcomer, and in its lower portion at least one cross section of flow (23) for the two-phase or poly-phase mixture formed in said downcomer for distributing it over the bed of granular solid located below said lower portion, the sub-assembly being characterized in that each downcomer contains at least one packing between its upper portion and its lower portion constituted by at least one element, the cross section for flow of the at least one gas phase is essentially transverse to the downcomer axis, said element extending across the whole of the transverse cross section of the downcomer in the a circulation zone and being constituted by cells through which said liquid and said gas phase pass, said cells orientating the circulation of fluids inside said downcomer in a substantially radial direction.

2. A sub-assembly according to claim 1, comprising at least one means for dispersing the two-phase or poly-phase mixture formed in said downcomer located close to the cross section of flow (23) of the lower portion of each downcomer.

3. A sub-assembly according to claim 2, in which each downcomer contains at least two non contiguous packings, the last packing, located close to the cross section of flow (23) of the lower portion of each downcomer, carrying out said function of dispersing the two-phase or poly-phase mixture formed in said downcomer.

4. A sub-assembly according to claim 2, in which the means carrying out the dispersion of the two-phase or poly-phase mixture formed in the downcomer is a jet disturber device with a controlled porosity located below and close to the cross section of flow (23) of the lower portion of said downcomer.

5. A sub-assembly according to claim 1, in which the downcomer comprises at least two cross sections of flow (2) of the liquid phase located at different levels above the distributor tray (P) and below the cross section of flow (22) closest to said distributor tray (P).

6. A sub-assembly according to claim 1, in which the cross sections of flow of the liquid phase are apertures of any shape and/or slots.

7. A sub-assembly according to claim 1, in which the cross section of flow (2) of the liquid phase closest to the distributor tray (P) is located at a sufficient distance from said tray (P) for a level of liquid to be established above said tray (P).

8. A sub-assembly according to claim 1, in which the downcomer comprises a portion above the distributor tray (P) and a portion below the distributor tray (P).

9. A polyfunctional sub-assembly ensuring contact, material distribution and heat and/or material exchanae of at least one gas phase, and at least one liquid phase, for a vessel containing at least one bed of granular solid, said phases being in overall downflow mode and traversing said bed of granular solid, said sub-assembly comprising at least one distributor tray (P) located above the bed of granular solid, comprising a plurality of downcomers (1) having a substantially vertical axis, each surmounted by at least one jet disturber device and each having in its upper portion at least one cross section of flow (22) for entry of the major portion of said gas phase into said downcomer and, between said upper portion and the lower portion of said downcomer above tray (P), at least one cross section of flow (2) for entry of the major portion of said liquid phase into said downcomer, and in its lower portion at least one cross section of flow (23) for the two-phase or poly-phase mixture formed in said downcomer for distributing it over the bed of granular solid located below said lower portion, the sub-assembly being characterized in that each downcomer contains at least one packing between its upper portion and its lower portion constituted by at least one element, the cross section for flow of the at least one gas phase is essentially transverse to the downcomer axis, said element extending across the whole of the transverse cross section of the downcomer in a circulation zone and being constituted by cells through which said liquid and said gas phase pass, said cells orientating the circulation of fluids inside said downcomer in a substantially radial direction, and comprising at least one means for dispersing the two-phase or poly-phase mixture formed in said downcomer located close to the cross section of flow (23) of the lower portion of each downcomer, in which each downcomer contains at least two non contiguous packings, the last packing, located close to the cross section of flow (23) of the lower portion of each downcomer, carrying out said function of dispersing the two-phase or poly-phase mixture formed in said downcomer, and in which the last packing, located close to the cross section of flow (23) of the lower portion of each downcomer carrying out said function of dispersing the two-phase or poly-phase mixture formed in said downcomer, comprises a portion that is internal to the downcomer and a portion that is external to said downcomer.

10. A vessel comprising an upper part and a lower part, an inlet in communication with the upper part for a first liquid fluid and for a second gaseous fluid, at least one bed of granular solids in the interior of said vessel, mounted above said bed a sub-assembly according to claim 1, and above said sub-assembly, said vessel comprising at least one side inlet for a third fluid, which may be identical to or different from said first or second fluid.

11. A vessel according to claim 10, further comprising a heat exchanger and/or material exchanger of said third fluid with at least one of said first or second fluids.

12. A vessel according to claim 10, for carrying out a catalytic reaction in which the bed (or beds) of granular solid is a catalyst bed.

13. A vessel according to claim 10, comprising means for carrying out a catalytic reaction in which one of the fluids is hydrogen.

14. A vessel according to claim 10, comprising a source of gas as said third fluid.

15. A polyfunctional sub-assembly ensuring contact, material distribution and heat and/or material exchange of at least one gas phase, and at least one liquid phase, for a vessel containing at least one bed of granular solid, said phases being in overall downflow mode and traversing said bed of granular solid, said sub-assembly comprising at least one distributor tray (P) located above the bed of granular solid, comprising a plurality of downcomers (1) having a substantially vertical axis, each surmounted by at least one jet disturber device and each having in its upper portion at least one cross section of flow (22) for entry of the major portion of said gas phase into said downcomer and, between said upper portion and the lower portion of said downcomer above tray (P), at least one cross section of flow (2) for entry of the major portion of said liquid phase into said downcomer, and in its lower portion at least one cross section of flow (23) for the two-phase or poly-phase mixture formed in said downcomer for distributing it over the bed of granular solid located below said lower portion, the sub-assembly being characterized in that each downcomer contains at least one packing between its upper portion and its lower portion constituted by at least one element, the cross section for flow of the at least one gas phase is essentially transverse to the downcomer axis, said element extending across the whole of the transverse cross section of the downcomer in a circulation zone and being constituted by cells through which said liquid and said gas phase pass, said cells orientating the circulation of fluids inside said downcomer in a substantially radial direction, and wherein each downcomer contains at least 2 non-contiguous packings, the last packing located close to the cross section of flow (23) of the lower portion of each downcomer carrying out said function of dispersing the two-phase or poly-phase mixture formed in said downcomer, and wherein said last packing comprises a portion that is internal to the downcomer and a portion that is external to said downcomer.

16. A polyfunctional sub-assembly ensuring contact, material distribution and heat and/or material exchange of at least one gas phase, and at least one liquid phase, for a vessel containing at least one bed of granular solid, said phases being in overall downflow mode and traversing said bed of granular solid, said sub-assembly comprising at least one distributor tray (P) located above the bed of granular solid, comprising a plurality of cylindrical shaped downcomers (1) each surmounted by at least one jet disturber device and each having in its upper portion at least one cross section of flow (22) for entry of the major portion of said gas phase into said downcomer and, between said upper portion and the lower portion of said downcomer above tray (P), at least one cross section of flow (2) for entry of the major portion of said liquid phase into said downcomer, and in its lower portion at least one cross section of flow (23) for the two-phase or poly-phase mixture formed in said downcomer for distributing it over the bed of granular solid located below said lower portion, the sub-assembly being characterized in that each downcomer comprises packing between said upper portion and said lower portion for providing energy in the gas/liquid mixture and for producing a high velocity in the downcomer.

* * * * *

UNITED STATES PATENT AND TRADEMARK OFFICE
CERTIFICATE OF CORRECTION

PATENT NO. : 7,060,232 B2
APPLICATION NO. : 09/835369
DATED : June 13, 2006
INVENTOR(S) : Harter et al.

It is certified that error appears in the above-identified patent and that said Letters Patent is hereby corrected as shown below:

On Title Page, Item (75)
    Inventors: line 1, reads "Lyons" should read -- Lyon --
    Inventors: line 3, reads "Brignais" should read -- Saint Genis Laval --
Column 7, line 28, reads "downcomer in the a" should read -- downcomer in a --
Column 7, line 66, reads "material exchanae" should read -- material exchange --

Signed and Sealed this

Nineteenth Day of December, 2006

JON W. DUDAS
*Director of the United States Patent and Trademark Office*